Jan. 23, 1945.　　　C. G. VEINOTT　　　2,367,980
REGULATING SYSTEM
Filed Jan. 21, 1944
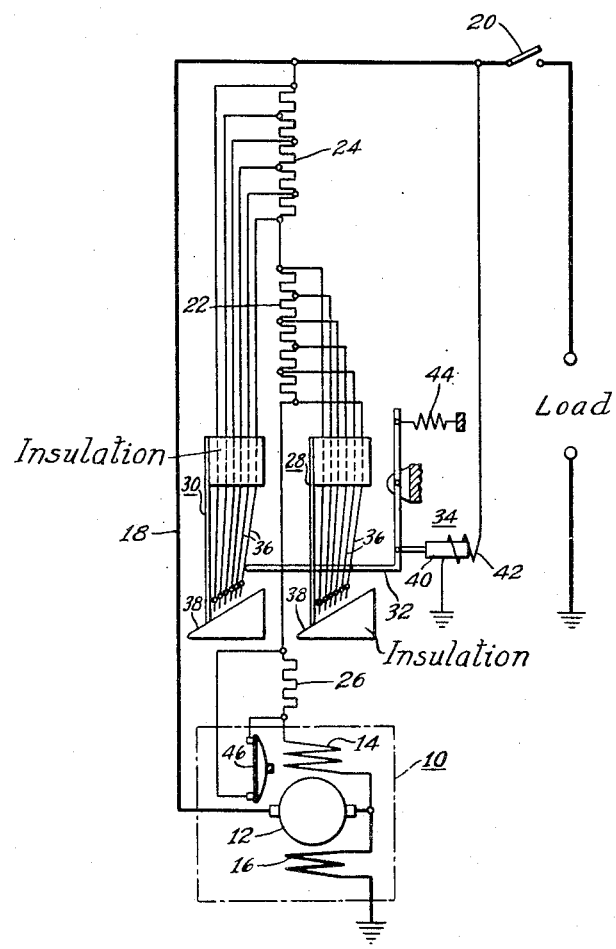
INVENTOR
*Cyril G. Veinott.*
BY
*James N. Ely*
ATTORNEY Patented Jan. 23, 1945

2,367,980

UNITED STATES PATENT OFFICE 2,367,980

REGULATING SYSTEM

Cyril G. Veinott, Lima, Ohio, assignor to Westinghouse Electric & Manufacturing Company, East Pittsburgh, Pa., a corporation of Pennsylvania Application January 21, 1944, Serial No. 519,155

3 Claims. (Cl. 171—229)

This invention relates to voltage regulating systems.

This application is a continuation-in-part of my application Serial No. 472,825 filed January 19, 1943.

The generators used on aircraft engines to supply constant voltage output over wide ranges of speed, load and temperature conditions require very sensitive voltage regulators to regulate the voltage of the generator by regulating the field current. Recently a voltage regulator has been developed which utilizes a plurality of thin spring leaves of conducting material for connecting or shunting different resistor sections of a field rheostat in circuit with the field winding of the generator to control the excitation thereof. Such voltage regulator switching apparatus is disclosed and claimed in Patent No. 2,326,036, issued August 3, 1943, to R. C. Jones, and has met with success in the aircraft industry, as well as in other applications.

In practice, it is noted, however, that the thin spring leaves of conducting material are sometimes damaged by excessive field current flowing therethrough. Usually such damage is found where the generator with which the regulator is employed has been operated at low temperatures and low speeds. The reasons for such excessive field current and consequent damage to the regulator will hereinafter be explained.

It is an object of this invention to provide in a voltage regulating system for preventing the flow of excessive or high current through the regulating switching apparatus.

Another object of this invention is to provide in a voltage regulating system for a generator which is to be operated under extreme temperature conditions for connecting a resistor in series circuit with the generator field winding upon the occurrence of some predetermined low temperature to limit the field current when the generator is operated at a critical speed outside its normal speed range and protect the regulating switching apparatus from damage so long as the low temperature condition is maintained.

Other objects of this invention will become apparent from the following description when taken in conjunction with the accompanying drawing, the single figure of which is a diagrammatic view of apparatus and circuits embodying the teachings of this invention.

Referring to the drawing, there is illustrated the regulating system of this invention as employed in conjunction with the generator 10 which is disposed to be driven by any suitable prime mover (not shown). The generator 10 may be of any type, or, as illustrated, be of the type commonly employed in aircraft, and comprises an armature winding 12, a shunt field winding 14, and a series field winding 16.

As illustrated, one side of the armature winding 12 is disposed to be connected through the conductor 18 and the manual switch 20 to a load (not shown) and from thence to ground, the other side of the armature winding 12 being connected through the series field winding 16 to ground. The shunt field winding 14 is disposed to be connected across the armature winding 12, one end of the winding 14 being connected to one side of the armature winding 12, the other end being connected through a field rheostat formed of series connected resistors 22 and 24 to the conductor 18. As illustrated, another resistor 26 is disposed to be connected in series circuit relation between the series connected resistors 22 and 24 and the field winding 14, the purpose of the resistor 26 being explained more fully hereinafter.

The connections to shunt or connect the different sections of the resistors 22 and 24 in circuit relation with the shunt field winding 14 are controlled by a plurality of switching units 28 and 30, respectively, which are actuated in a predetermined manner by a pivotally mounted driver member 32 in response to the energization of an electromagnet 34. The switching units 28 and 30 and the manner of operating them to obtain a progressive but staggered operation thereof to obtain a progressive but staggered shunting or connecting of the sections of resistors 22 and 24, respectively, are disclosed in the aforementioned Jones patent.

Briefly, each of the units 28 and 30 comprises a plurality of thin leaf spring members 36 of conducting material having one end fixed. The other end of each of the members 36 carries a contact member or button and is normally self-biased to seat against a sloped stop 38. The fixed ends of the conducting spring members 36 are connected to different taps along the resistor associated with the respective switching units 28 and 30. The spring leaves 36 of the units 28 and 30 are so assembled, or the driver member 32 is so constructed, as to obtain a progressive but staggered operation of the leaf members 36 of the two units when the driver member 32 is actuated as disclosed and claimed in the Jones patent identified hereinbefore.

The electromagnet 34 comprises a core member 40 connected at one end to the pivotally mounted driver member 32 and is normally energized by the energizing winding 42. The energizing winding 42 is connected at one end to the conductor 18, the other end being connected to ground, and when energized functions to pull the driver member 32 about its pivot against the pull of the biasing spring 44. Thus, the energizing winding 42 is connected in shunt with respect to the load, and its energization is a measure of the voltage drop across the load.

Damage to the spring leaves 36 can and does occur in service with a certain abnormal combination of circumstances. If the generator 10 is operated at a speed just below the minimum at which it will develop rated voltage, the energizing winding 42 will have insufficient strength to overcome the biasing spring 44 so that all of the resistance in resistors 22 and 26 will be shunted by the closed spring leaves, the outer pair of spring leaves in each of the two stacks 36 carrying full field current. In this position—incidentally the position shown in the drawing—there will be substantially full voltage impressed on the shunt field 14, the current in which will be then limited only by the resistance of the field itself. Thus, at any temperature, there is always a certain critical low operating speed which will result in substantially rated voltage and maximum field current. If the temperature of the generator is very low, a high maximum field current will result with accompanying damage to the spring leaves 36 which are necessarily delicate members unless provision is made for limiting the field current. How this can occur, and means to prevent it will be described in the following paragraphs in which reference is made to a specific example.

If the ohmic resistance of the field winding 14 is 2.0 ohms at 25° C., the maximum field current obtainable at 28 volts is 14 amperes. If the temperature of this field winding is reduced to −50° C., its resistance decreases to 1.43 ohms, so that the maximum field current at 28 volts is then 19.7 amperes, thereby, in effect, permitting 40% more field current to flow at the extremely cold temperature than is obtained at normal operating temperatures. This 40% increase in current amounts to a 100% increase in heating effect which has been found sufficient to damage the spring leaves permanently.

In order to protect the conducting spring leaf members 36 from the excessive currents referred to in the preceding paragraph, an auxiliary resistor 26 is disposed to be connected in circuit with the field winding 14 to limit the field current which is the current flowing through the spring leaves at the critical speed discussed in preceding paragraphs. But as this resistor 26 must only be in the circuit when the field 14 is at a low temperature, a thermostat 46 is so mounted or associated with the field winding 14 that it is responsive to changes in the temperature of the generator field winding for connecting or shunting the resistor in series circuit relation with the winding 14. In the present embodiment, the thermostat 46 is illustrated as being a snap-acting thermostat of the disc type which is so designed as to be in a circuit-closing position for normal temperatures, but which, upon the occurrence of an abnormal low temperature, will snap to an open-circuit position to thereby connect the resistor 26 in series with the field rheostat and the field winding of the generator.

The resistor 26 is selected in accordance with the changes in the resistance of the field winding 14 which will be encountered as the temperature decreases to some low predetermined temperature. The resistor 26 is selected to offset the resistance change in the field winding 14 which is to be expected in operation, while the thermostat 46 is selected so as to snap to its open circuit position at some predetermined low temperature to insure the connection of the compensating resistor in the field winding circuit at the low temperatures encountered. For example, if the field resistance decreases from 2.0 to 1.43 ohms at −50° C., the value of resistance in resistor 26 would be selected to be approximately 0.57 ohm, or more, if a temperature less than −50° C. were likely to be encountered.

In operation, assuming that the generator 10 is driven to deliver a predetermined voltage and the manual switch 20 is in its circuit closing position, then the energizing winding 42 of the electromagnet 34 is energized to operate the switching units 28 and 30 in a predetermined manner, whereby a number of the sections of the resistors 22 and 24, respectively, are connected in series circuit relation with the shunt field winding 14. If for any reason the load supplied by the generator 10 is changed, for example, if the load is decreased, then the winding 42 is energized to actuate the driven member 32 against the bias of its spring member 44 to effect a progressive but staggered release of the leaf members 36 of the switching units 28 and 30 to alternately control the connecting of the progressive sections of the resistor elements 22 and 24, respectively, in series circuit with the field winding 14 to effect a decrease in the energization of the field winding, and thereby decrease the voltage of the generator 10.

If, on the other hand, the load is increased, then the winding 42 is so deenergized that the driver member 32 is actuated under the influence of the spring 44 to effect a switching operation of the switching units 28 and 30 to force their leaf spring members 36 progressively but staggered away from their sloped stops 38 to progressively but in staggered relation to shunt the resistor sections of the associated resistors 22 and 24, respectively. This operation to effect the alternate shunting of progressive sections of each of the resistors 22 and 24 from circuit with the field winding 14 effects an increase in the energization of the field winding, and consequently an increase in the voltage of the generator 10.

In both of the operations described hereinbefore, it has been assumed that the aircraft is operating at normal or higher temperatures, and that the thermostat 46 is in its circuit closing position to shunt the compensating resistor 26. If, however, during either of the operations described hereinbefore the aircraft is operated at abnormally low temperatures, or if the engine is cold when first started, or for any other reason the generator is operating at a critical speed outside the normal speed range at which full field current is insufficient to develop the required generator voltage, then, at some predetermined low temperature, the thermostat 46 is actuated to its circuit opening position to connect the compensating resistor 26 in series circuit with the field winding 14. It is quite apparent that when the compensating resistor 26 is connected in series circuit with the field winding 14, that the field current which flows through the conducting leaf spring members 36 which have been actuated to their circuit closing position by the bias of the spring 44 is limited. The resistor 26 is maintained in its series circuit relation with the field winding 14 until the abnormally low temperature condition ceases to exist, at which point the disc-type thermostat 46 will snap to its circuit closing position to again shunt the resistor 26.

By employing the thermostat and compensating resistor in the regulating system as described hereinbefore, it is evident that damage to the spring leaf members of the switching apparatus when in the closed circuit position is prevented by limiting the field current. The regulating system described is efficient in operation, being very sensitive and quick in response. Further, there are very few mechanical parts which will require adjustment in the field.

Although this invention has been described with reference to a particular embodiment thereof, it is, of course, not to be limited thereto except insofar as is necessitated by the scope of the appended claims.

I claim as my invention:

1. In a voltage regulating system, in combination, a generator the voltage of which is to be regulated, a field winding for exciting the generator, the generator being disposed for operation at a critical speed outside a normal speed range at which full field current is insufficient to develop the required generator voltage, a rheostat connected in circuit relation with the field winding for controlling the voltage impressed on the field winding, means comprising a plurality of switching contact members disposed for progressive movement for controlling the connecting of the rheostat in response to the generator voltage, an auxiliary resistor, and means associated with the field winding of the generator responsive to a decrease in temperature of the field winding to a predetermined temperature for connecting the auxiliary resistor in circuit relation with the field winding to compensate for changes in the resistance of the field winding occasioned by said decrease in temperature to limit the field current traversing the switching contact members when the contact members are in a closed position and the generator is operated at the critical speed outside the normal speed range, said means also being responsive to shunt the auxiliary resistor as the temperature of the field winding increases above said predetermined value.

2. In a voltage regulating system, in combination, a generator the voltage of which is to be regulated, a field winding for exciting the generator, the generator being disposed for operation at a critical speed outside a normal speed range at which full field current is insufficient to develop the required generator voltage, a rheostat connected in circuit relation with the field winding for controlling the voltage impressed on the field winding, means comprising a plurality of switching contact members disposed for progressive movement for controlling the connecting of the rheostat in response to the generator voltage, an auxiliary resistor, and a thermostat associated with the field winding of the generator responsive to a decrease in temperature of the field winding to a predetermined temperature for connecting the auxiliary resistor in circuit relation with the field winding to compensate for changes in the resistance of the field winding occasioned by said decrease in temperature to limit the field current traversing the switching contact members when the contact members are in a closed position and the generator is operated at the critical speed outside the normal speed range.

3. In a voltage regulating system, in combination, a generator the voltage of which is to be regulated, a field winding for exciting the generator, the generator being disposed for operation at a critical speed outside a normal speed range at which full field current is insufficient to develop the required generator voltage, a rheostat connected in circuit relation with the field winding for controlling the voltage impressed on the field winding, means comprising a plurality of switching contact members disposed for progressive movement for controlling the connecting of the rheostat in response to the generator voltage, an auxiliary resistor, and a snap acting thermostat associated with the field winding of the generator responsive to a decrease in temperature of the field winding to a predetermined temperature for connecting the auxiliary resistor in circuit relation with the field winding to compensate for changes in the resistance of the field winding occasioned by said decrease in temperature to limit the field current traversing the switching contact members when the contact members are in a closed position and the generator is operated at the critical speed outside the normal speed range, the thermostat also being responsive to shunt the auxiliary resistor as the temperature of the field winding increases above said predetermined value.

CYRIL G. VEINOTT.